June 25, 1968 W. L. McGRATH 3,389,571
MULTIPLE-EFFECT ABSORPTION REFRIGERATION SYSTEMS
Filed May 31, 1967
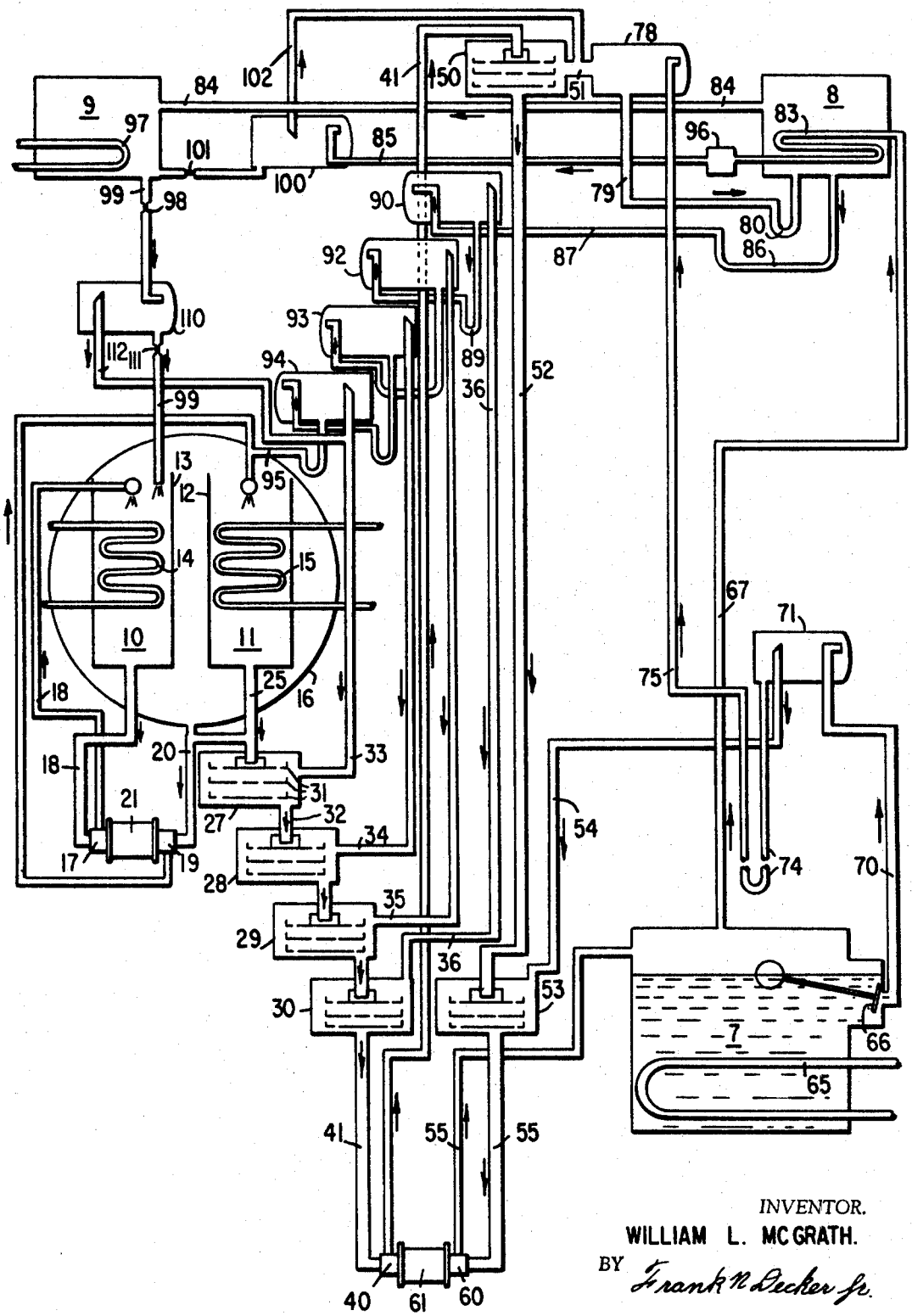
INVENTOR.
WILLIAM L. MCGRATH.
BY Frank N Decker Jr.
ATTORNEY.

United States Patent Office 3,389,571
Patented June 25, 1968

3,389,571
MULTIPLE-EFFECT ABSORPTION
REFRIGERATION SYSTEMS
William L. McGrath, Syracuse, N.Y., assignor to Carrier
Corporation, Syracuse, N.Y., a corporation of Delaware
Filed May 31, 1967, Ser. No. 642,369
16 Claims. (Cl. 62—101)

ABSTRACT OF THE DISCLOSURE

A double-effect absorption refrigeration system having a primary absorber, a primary evaporator, a high pressure generator, a low pressure generator, a high pessure condensing section, and a low pressure condenser, connected to provide refrigeration. A plurality of auxiliary absorber stages are connected in a weak solution line between the primary absorber and the high pressure generator. A plurality of auxiliary evaporator stages are connected in an intermediate solution line between the high pressure generator and the low pressure generator, and a plurality of auxiliary evaporator stages are connected in a strong solution line between the low pressure generator and the primary absorber. Stages of the auxiliary evaporators are connected by refrigerant vapor passages with the auxiliary absorbers so as to simultaneously concentrate and cool absorbent solution leaving the generator while also simultaneously heating and diluting weak solution passing to the generators. A high pressure refrigerant economizer is employed to evaporate a portion of the refrigerant condensed in the high pressure condenser to cool the remaining refrigerant therein, and the refrigerant vapor is passed to one of the auxiliary absorbers to further dilute and cool solution therein. A low pressure refrigerant economizer is employed to evaporate a portion of the refrigerant condensed in the low pressure condenser to cool the remainder thereof, and the vapor formed therein is passed to another auxiliary absorber to cool and dilute weak solution.

Cross references to related applications

The low and high pressure refrigerant economizers disclosed in this application is the subject matter of my co-pending application Ser. No. 642,405 filed concurrently herewith.

The high pressure refrigerant liquid circuit disclosed herein is the subject matter of my co-pending application Ser. No. 642,368 filed concurrently herewith.

The low pressure auxiliary absorber arrangement is the subject matter of my co-pending application Ser. No. 642,367 filed concurrently herewith.

Background of the invention

This application relates to multiple-effect absorption refrigeration systems. Such systems evaporate refrigerant in an evaporator to produce refrigeration and absorb the evaporated refrigerant in an absorbent salt solution in an absorber. The resulting weak solution is pumped through a pair of heat exchangers to a high pressure generator where it is boiled to form hot intermediate strength solution and refrigerant vapor. The hot intermediate solution is passed through one of the heat exchangers to a low pressure generator where it is further concentrated by heat exchange with the hot refrigerant vapor formed in the high pressure generator. The resulting strong solution is cooled in the other heat exchanger and returned to the absorber. Refrigerant vapor is condensed in a condenser section of the low pressure generator and is returned to the evaporator. The refrigerant vapor formed in the low pressure generator is condensed in a low pressure condenser and is also returned to the evaporator.

Double-effect absorption refrigeration systems theoretically can provide very high efficiency due to the fact that the heat input is re-used in the cycle. Thus, it is possible to absorb more heat from the region being cooled than the quantity of heat energy put in the system to operate it.

However, known double-effect absorption refrigeration systems are limited by serious practical difficulties. First, in order to achieve high efficiency at reasonable costs, it is necessary to provide heat exchangers between the strong and weak solutions and between the intermediate and weak solutions. In the past, these heat exchangers have required large and expensive heat exchange surface because of the larger quantities of heat to be transferred, which materially added to the cost of the double-effect systems. Second, a very high generator temperature has been required in combination with a relatively high absorbent solution concentration in order to provide a sufficiently high concentration of absorbent in the absorber to achieve high thermodynamic efficiency. It is well known that high absorbent salt solution concentrations at high temperatures result in accelerated corrosion of metal parts in the generator. Consequently, it has been previous practice to provide very expensive materials in one generator and heat exchangers in order to avoid serious corrosion problems in a double-effect system. Third, if the generator temperature is reduced by using a more dilute cycle, the lowered solution concentration in the absorber results in lowered capacity and very greatly increased heat transfer surface in the absorber to achieve a desired refrigerant temperature due to the need for greater absorber surface to achieve a given vapor pressure with a more dilute absorbent concentration.

Thus, in the past, double-effect systems have suffered from the high cost of greatly increased heat transfer surface required from the high cost of special corrosion resistant materials or from impractical absorber cooling requirements, which, to some extent, has offset their theoretical advantages.

Summary of the invention

In accordance with this invention, a double-effect absorption refrigeration system is provided which employs an auxiliary high pressure evaporator for evaporating refrigerant vapor thereby concentrating and cooling the hot intermediate strength absorbent solution leaving the high pressure generator. The refrigerant evaporated in the high pressure auxiliary evaporator is absorbed in a corresponding high pressure auxiliary absorber to dilute and heat the warm weak solution supplied to the high pressure generator.

Thus, the concentration of solution in the high pressure generator is maintained relatively lower than in conventional double-effect systems while at the same time the intermediate strength solution is concentrated while it is being cooled in the auxiliary evaporator. The auxiliary absorbers and auxiliary evaporators do not require conventional heat exchange surface and since they also perform the function of a conventional heat exchanger, a substantial reduction in cost is achieved. Furthermore, the weak absorbent solution is diluted before entering the high pressure generator so that more refrigerant vapor can be boiled from the solution at a lower concentration and a lower solution temperature than heretofore possible and still generate the same vapor pressure with which to operate the low pressure generator, as in conventional double-effect machines. This materially reduces corrosion in the high pressure generator. Since the auxiliary evaporator concentrates the intermediate solution while reducing its temperature, the thermodynamic efficiency of the system is comparable to a conventional double-effect machine having a much higher generator temperature.

This efficiency is achieved without any increased heat transfer surface in the absorber and by eliminating the heat transfer surface of the two conventional solution heat exchangers.

In addition, a low pressure auxiliary evaporator may be employed to concentrate strong absorbent solution leaving the low pressure generator while cooling the strong solution before it enters the primary absorber. For this purpose, a low pressure auxiliary absorber is provided for absorption of the refrigerant vapor formed in the low pressure auxiliary evaporator. The low pressure auxiliary absorber also serves to heat and dilute the weak absorbent solution prior to passing into the high pressure auxiliary absorber.

A still further improvement in efficiency may be achieved in accordance with this invention by evaporating a portion of the refrigerant condensed in the high pressure condenser section of the low pressure generator in order to cool the refrigerant prior to its passage to the primary evaporator. This evaporation is achieved in three ways in the preferred embodiment. First, the high pressure liquid refrigerant is passed to the low presure condenser where a portion evaporates and is recondensed while cooling the remainder. Second, a high pressure refrigerant economizer may be employed to evaporate a portion of the refrigerant condensed in the high pressure condenser, thereby cooling the remainder. The refrigerant vapor formed in the high pressure refrigerant economizer is passed to the auxiliary high pressure absorber where it further heats and dilutes the weak solution passing to the high pressure generator. Third, a low pressure refrigerant economizer may be employed to evaporate a portion of the refrigerant condensed in the low pressure condenser, thereby cooling the remainder prior to its passage to the primary evaporator. The refrigerant vapor formed in the low pressure refrigerant economizer is passed to the low pressure auxiliary absorber where it also further heats and further dilutes the weak solution passing toward the high pressure generator.

*Brief description of the drawing*

The drawing illustrates a schematic cross-section through a double-effect absorption refrigeration system in accordance with a preferred embodiment of this invention.

*Description of the preferred embodiment*

Referring to the drawing, there is shown a multiple-effect absorption refrigeration system employing two effects and of a type which may use water as a refrigerant and an aqueous solution of hygroscopic salt, such as lithium bromide, as an absorbent. Various additives may be added to the solution, such as 2-ethyl hexanol, to enhance heat transfer, and lithium bromide to inhibit corrosion. As used herein "weak" solution refers to a solution weak in absorbent salt and absorbing power, and "strong" solution refers to a solution strong in absorbent salt and absorbing power.

The double-effect absorption system comprises a high pressure generator 7, a low pressure generator 8 having a high pressure condenser section associated therewith, a low pressure condenser 9, a primary absorber 11 and a primary evaporator 10.

Primary evaporator 10 and primary absorber 11 are preferably disposed within a single low pressure shell 16. An internal partition 12 forms a primary absorber chamber and an internal partition 13 forms a primary evaporator chamber within shell 16. A plurality of evaporator heat exchange tubes 14 are arranged within partition 13 for passage of a fluid medium, such as water, to be chilled by the refrigeration system. A plurality of absorber heat exchange tubes 15 are disposed within partition 12 and arranged for passage of a cooling medium, such as water, to a suitable heat rejection location, such as a conventional cooling tower.

Liquid refrigerant is distributed over evaporator tubes 14 and is evaporated to cool the fluid passing through the evaporator tubes. The unevaporated refrigerant liquid passes from the bottom of a sump formed by partition 13 through an evaporator recirculation pump 17 and recirculation passage 18 from which it is again distributed over evaporator tubes 14.

Cool, concentrated, strong absorbent solution is distributed over absorber tubes 15 and cooled by heat exchange with the medium passing therethrough. A portion of the absorbent solution collected in the bottom of a sump formed by partition 12 is recirculated by absorber recirculation pump 19 through recirculation line 20 from which it is again discharged over absorber tubes 15. A single electric motor 21 may operate both pumps 17 and 19.

The absorbent solution in primary absorber 11 is diluted by absorption of refrigerant vapor therein from primary evaporator 10. Cold, moderately weak absorbent solution passes through moderately weak solution passage 25 from the bottom of partition 12 and shell 16 into the first stage 27 of a low pressure auxiliary absorber. From there, the moderately weak solution passes into second stage 28, third stage 29, and fourth stage 30 of the low pressure auxiliary absorber. Each of the stages may be substantially similar and preferably comprises a plurality of perforated liquid distribution pans 31 arranged for cascading flow of fluid from one pan to the succeeding pan throughout each stage. A connecting passage 32 passes solution from first stage 27 to second stage 28 and similar connecting passages are provided between the succeeding stages. A refrigerant vapor inlet passage 33 admits refrigerant vapor to be absorbed into first stage 27, and similar refrigerant vapor inlet passages 34, 35 and 36 admit refrigerant vapor into their respective succeeding stages of the low pressure auxiliary absorber.

A low pressure weak solution pump 40 passes warm weak solution from the last stage 30 of the low pressure auxiliary absorber through weak solution passage 41 to the first stage 50 of a high pressure auxiliary absorber. First stage 50 of the high pressure auxiliary aborber may be similar in construction to first stage 27 of the low pressure auxiliary absorber and is provided with a refrigerant vapor inlet passage 51 to admit refrigerant vapor into the stage for absorption into absorbent solution therein. A connecting passage 52 passes solution from first stage 50 to a second stage 53 of the high pressure auxiliary absorber. Second stage 53 is provided with a refrigerant vapor passage 54 for admitting refrigerant vapor into the stage for absorption into absorbent solution therein. The resulting very weak, very warm, absorbent solution is passed through very weak solution line 55 by very weak solution pump 60 into high pressure generator 7 for concentration therein. Pumps 40 and 60 may be driven by a single electric motor 61.

High pressure generator 7 includes generator heat exchange tubes 65 for passing steam in heat exchange relation with absorbent solution therein. Other heating media may be employed, or alternatively, the generator may be directly fired by a combustible gas. The absorbent solution in generator 7 is boiled to vaporize refrigerant and to concentrate the solution. Hot intermediate strength absorbent solution passes from high pressure generator 7 through float valve 66 and intermediate solution passage 70, to the first stage 71 of a high pressure auxiliary evaporator.

Stage 71 may comprise a hollow vessel in which the incoming solution is discharged against one wall thereof to prevent carryover of liquid droplets into the vapor outlet passage. Refrigerant vapor passage 54 terminates in the vapor space within high pressure auxiliary evaporator stage 71. This passage conducts refrigerant vapor evaporated in high pressure auxiliary evaporator first stage 71 to the last stage 53 of the high pressure auxiliary absorber.

Intermediate solution passes from the first stage 71 of the high pressure auxiliary absorber through a solution trap 74 in passage 75 to second stage 78 of the auxiliary high pressure evaporator, which may be similarly constructed to that of the first stage 71. Refrigerant vapor passage 51 conducts refrigerant vapor from second stage 78 of the auxiliary high pressure evaporator to first stage 50 of the high pressure auxiliary absorber.

Refrigerant vapor is evaporated from the intermediate absorbent solution in the stages of the high pressure auxiliary evaporator, thereby simultaneously concentrating and cooling the hot intermediate strength solution to form moderately hot, concentrated intermediate solution. The concentrated intermediate solution passes through intermediate solution passage 79 and solution trap 80 into low pressure generator 8.

The various solution traps, such as traps 74 and 80, are designed to have a vertical height, such that the level of solution in the leg thereof connecting with the next lower pressure stage, balances the solution level and the pressure difference from the previous higher pressure zone to prevent vapor from passing between the stages.

Low pressure generator 8 comprises a combined generator-condenser and is provided with heat exchange tubes 83 which form a high pressure condenser section therein. The hot refrigerant vapor formed in high pressure generator 7 passes through high pressure refrigerant vapor passage 67 and heat exchange tubes 83 to boil the solution in the lower pressure generator while condensing the vapor within heat exchange tubes 83. The refrigerant vapor formed in the low pressure generator passes through low pressure refrigerant vapor passage 84 to low pressure condenser 9. The strong absorbent solution formed in low pressure generator 8 passes through solution trap 86 and strong solution passage 87 to the first stage 90 of an auxiliary low pressure evaporator. The refrigerant condensed in high pressure condenser tubes 83 passes through steam trap 96 to low pressure condenser 9.

First stage 90 and the succeeding stages of the low pressure auxiliary evaporator may be constructed similarly to first stage 71 of the high pressure auxiliary evaporator. Refrigerant vapor passage 36 extends from the last stage 30 of the low pressure auxiliary absorber and terminates in the vapor space in first stage 90 of the low pressure auxiliary evaporator to conduct refrigerant vapor formed in first stage 90 to last stage 30. The strong absorbent solution passes from first stage 90 of the low pressure auxiliary evaporator through solution trap 89 into second stage 92 in which additional refrigerant is evaporated from the solution. The solution then passes into succeeding stages 93 and 94 where still further evaporation of refrigerant vapor takes place. Second stage 92 of the low pressure auxiliary evaporator is in vapor communication with third stage 29 of the low pressure auxiliary absorber through refrigerant vapor passage 35, and similarly third stage 93 and fourth stage 94 are in communication with second stage 28 and first stage 27, through refrigerant vapor passages 34 and 33 respectively.

The concentrated strong absorbent solution passes from last stage 94 through a solution trap into concentrated strong solution line 95 from which it is discharged over absorber heat exchange tubes 15 in primary absorber 11.

The low pressure refrigerant vapor passes from low pressure refrigerant vapor passage 84 into low pressure condenser 9 and is condensed therein by heat exchange with a suitable cooling medium passing through condenser heat exchange tubes 97. The cooling medium rejects heat from low pressure condenser 9 to a suitable location, such as a cooling tower. Also, high pressure liquid refrigerant passes from high pressure refrigerant liquid passage 85 into low pressure condenser 9 and is partially evaporated therein by flashing, thereby cooling the remainder thereof upon being discharged in the low pressure condenser. The resulting vapor is recondensed in condenser 9.

Condensed refrigerant passes from low pressure condenser 9 through restriction 98 in low pressure refrigerant passage 99 and is discharged over evaporator heat exchange tubes 14 in primary evaporator 10.

It is preferred to employ a high pressure refrigerant economizer 100 in the high pressure refrigerant passage 85. High pressure refrigerant economizer 100 may comprise a vessel similar in construction to the auxiliary evaporator stages. A portion of the liquid refrigerant passing to the high pressure refrigerant economizer is evaporated therein to cool the remaining liquid refrigerant. The refrigerant vapor formed in the high pressure economizer passes through refrigerant vapor passage 102 into refrigerant vapor passage 51 and is absorbed in first stage 50 of the high pressure auxiliary absorber. Thus, the warm refrigerant liquid from the high pressure condenser is cooled prior to passing to the primary absorber and the refrigerant vapor formed in the high pressure economizer is absorbed into weak solution to heat and dilute the weak solution. The cooled high pressure refrigerant liquid passes through a high pressure refrigerant liquid restriction 101 to low pressure condenser 9. Steam trap 96 and restriction 101 maintain a pressure zone in the high pressure refrigerant economizer 100 intermediate the pressures in high pressure condenser 8 and low pressure condenser 9.

It is also preferred to employ a low pressure refrigerant economizer 110 in low pressure refrigerant liquid passage 99. Low pressure refrigerant economizer 110 is similar in construction to economizer 100 and vapor formed therein passes through vapor passage 112 and passage 33 into first stage 27 of the low pressure absorber. Low pressure refrigerant restriction 111 and restriction 98 are disposed in the inlet and discharge passages associated with low pressure refrigerant economizer 110 to maintain a pressure zone therein, intermediate the pressures in low pressure condenser 9 and primary evaporator 10. A portion of the low pressure liquid refrigerant is evapoated in low pressure refrigerant economizer 110 to cool the remaining refrigerant prior to its discharge over primary evaporator heat exchange tubes 14. The refrigerant vapor thus formed is absorbed into and dilutes and heats the cold moderately weak solution in first stage 27 of the low pressure auxiliary absorber.

In operation, the pressures in serially connected low pressure auxiliary absorber stages 27, 28, 29 and 30 successively increase in the direction of solution flow therethrough from primary absorber 11 toward the high pressure auxiliary absorber and high pressure generator 7. The low pressure auxiliary absorber stages form successively increasing pressure zones intermediate the pressures in primary absorber 11 and first stage 50 of the high pressure auxiliary absorber.

Similarly, the pressure in second stage 53 of the high pressure auxiliary absorber is greater than the pressure in first stage 50 thereof. Both serially connected stages form successively increasing pressure zones intermediate the pressure in last stage 30 of the low pressure auxiliary absorber and the high pressure generator 7, in the direction of solution flow therethrough from primary absorber 11 to high pressure generator 7.

A typical mode of operation would occur where moderately weak (60%), cold (106° F.), absorbent solution from primary absorber 11 is successively diluted and heated in the stages of the low pressure auxiliary absorber by adsorption of refrigerant vapor therein, to form warm (156° F.), weak (58.8%) solution which passes to the high pressure auxiliary absorber. The warm weak solution is successively further diluted and further heated by absorption of refrigerant vapor therein, as it passes through the stages of the high pressure auxiliary absorber to form very warm (245° F.), very weak (56.7%) absorbent solution which passes to high pressure generator 7.

The quantity of refrigerant which can be formed by boiling weak solution in the high pressure generator at a given temperature is greatly increased because the solution passed thereto is very weak in absorbent salt. Thus, a low generator temperature becomes feasible by use of this invention. In addition, very weak solution results in a much lower corrosion rate of metal parts in the high pressure generator than would occur with stronger solution at the same temperature level. It is also important to note that while the auxiliary absorbers perform both a dilution and a heating function to make these advantages possible, they achieve this result without employing expensive heat exchange tube surface and so possess a significant cost advantage over conventional solution heat exchangers.

The hot (307° F.), intermediate strength (58.7%) absorbent solution from the high pressure generator is further concentrated as it passes through the high pressure auxiliary evaporators by the evaporation of refrigerant vapor therein. At the same time, not only is the concentration of the solution increased, but its temperature is reduced so that only moderately hot (220° F.) but concentrated (60.7%) intermediate solution passes into the low pressure generator. Again, these advantages are achieved without employing expensive heat transfer surface and at a relatively low temperature so that corrosion problems are minimized.

The absorbent solution is further cooled and concentrated by evaporation of refrigerant therefrom in the low pressure generator and the moderately cool (195° F.) strong solution (63.3%) is serially passed through the stages of the low pressure auxiliary evaporator. Still further, refrigerant vapor is evaporated from the strong solution in the low pressure auxiliary evaporator stages. The solution is further cooled, due to the evaporation of refrigerant therefrom and the cool (145° F.) concentrated strong solution (64.5%) is passed to the primary absorber to absorb refrigerant vapor therein.

The use of auxiliary evaporators for concentrating the intermediate and strong solutions provide important advantages over the conventional systems. First, the auxiliary evaporators serve to concentrate the intermediate and strong solutions so that high concentrations and high generator temperature is not required to provide a normal concentration of absorbent solution entering the absorber. Also, this concentrating of the absorbent results in a drastic reduction in absorber heat transfer surface required due to a lowered absorber dewpoint being produced for a given absorber temperature. Second, the auxiliary evaporators cool the solution by evaporation of refrigerant from solution, thereby eliminating the necessity for conventional heat transfer surface heat exchangers. Third, the auxiliary evaporators provide refrigerant vapor to heat and dilute absorbent solution passing to the high pressure generator in order to make it possible to boil the solution at a relatively low temperature compared to conventional double-effect systems.

It will be seen that the cycle described achieves all the advantages of a conventional double-effect absorption refrigeration system in a significantly improved manner. Specifically, the temperature in the high pressure generator may be greatly reduced compared to equivalent conventional systems, because the weak solution entering the generator has been further diluted by mass heat exchange with strong solution flowing toward the absorber.

In addition, the condensed refrigerant may be cooled in several locations before entering the primary evaporator. It is first cooled in high pressure refrigerant economizer 100, next it is cooled in low pressure condenser 9, and finally it is cooled in low pressure refrigerant economizer 110. In each instance, the refrigerant is cooled by vaporizing a portion thereof to cool the remaining refrigerant. The refrigerant vapor in the high pressure refrigerant economizer is used to still further dilute and heat the weak solution passing through the high pressure auxiliary evaporator, and the refrigerant vapor formed in the low pressure refrigerant economizer is used to still further dilute and heat the weak solution passing through the low pressure auxiliary evaporator, and the refrigerant vapor formed in the low pressure refrigerant economizer is used to still further dilute and heat the weak solution passing through the low pressure auxiliary absorber. The refrigerant vapor formed in the low pressure condenser is recondensed therein and the latent heat thereof is rejected from the system.

It will be understood that various numbers of stages may be employed in the auxiliary evaporators and auxiliary absorbers and refrigerant economizers to attain the desired concentrations and temperatures in the system. Furthermore, the stages of the auxiliary evaporators and auxiliary absorbers may be combined into one or more unitary structures similar to a flash distillation apparatus. Either one of the auxiliary evaporators and absorbers may be replaced with conventional heat exchangers, if desired. The refrigerant economizers may comprise open pans therein to simplify the construction of the system. Various other refrigerants and absorbents may be used in the system and other cooling media, such as air, to cool the system depending upon the parameters of the specific refrigeration cycle.

Also, the absorption refrigeration system may utilize more than two effects, and consequently the terms "high pressure," "low pressure," "strong," "weak" and "intermediate" and other similar terms are used merely for clarity to distinguish relative relationship of the components, solutions, temperatures or pressures and not as a limitation on the number of effects in the cycle.

Various other modifications of this invention may be envisioned within the scope of this invention, and this invention may be otherwise embodied within the scope of the following claims.

I claim:
1. An absorption refrigeration system comprising:
 (A) a primary absorber;
 (B) a primary evaporator;
 (C) a high pressure generator;
 (D) a low pressure generator having a high pressure condenser section associated therewithin;
 (E) a low pressure condenser;
 (F) weak solution passage means for passing weak absorbent solution from said primary absorber to said high pressure generator for concentration therein;
 (G) intermediate solution passage means for passing intermediate strength absorbent solution from said high pressure generator to said low pressure generator for further concentration therein;
 (H) strong solution passage means for passing strong absorbent solution from said low pressure generator to said primary absorber for absorption of refrigerant vapor therein;
 (I) high pressure refrigerant vapor passage means for passing high pressure refrigerant vapor formed in said high pressure generator through the high pressure condenser section of said low pressure generator for condensing said vapor and heating solution in said low pressure generator;
 (J) low pressure refrigerant vapor passage means for passing low pressure refrigerant vapor formed in said low pressure generator to said low pressure condenser for condensing said vapor;
 (K) refrigerant liquid passage means for passing condensed refrigerant from said low pressure condenser to said primary evaporator for evaporation therein; and
 (L) refrigerant vapor passage means for passing evaporated refrigerant from said primary evaporator to said primary absorber for absorption into absorbent solution;
wherein the improvement comprises:

(M) a high pressure auxiliary evaporator disposed in said intermediate solution passage to receive intermediate strength solution from said high pressure generator for concentrating and cooling said intermediate solution prior to passing to said low pressure generator; said high pressure auxiliary evaporator having a pressure therein intermediate the pressures in said primary evaporator and said high pressure generator during operation of said system;

(N) a high pressure auxiliary absorber disposed in said weak solution passage, to receive weak solution for diluting and heating said weak solution prior to passing to said high pressure generator, said high pressure auxiliary absorber having a pressure therein intermediate the pressures in said low pressure generator and said high pressure generator during operation of said system; and (O) refrigerant vapor passage means to pass refrigerant vapor evaporated from warm intermediate solution in said high pressure auxiliary absorber for absorption into relatively cool, weak absorbent solution therein.

2. An absorption refrigeration system as defined in claim 1 wherein:

(A) said high pressure auxiliary absorber comprises a plurality of stages serially connected for solution flow from said primary absorber toward said high pressure generator, each of said high pressure auxiliary absorber stages having a successively increasing pressure in the direction of solution flow therethrough when the system is in operation;

(B) said high pressure auxiliary evaporator comprises a plurality of stages serially connected for solution flow from said high pressure generator toward said low pressure generator, each of said high pressure auxiliary evaporator stages having a successively diminishing pressure in the direction of solution flow therethrough when said system is in operation; and (C) each of said stages of said low pressure auxiliary evaporator being connected to a corresponding pressure stage of said auxiliary absorber by a refrigerant vapor passage so that refrigerant in said high pressure auxiliary evaporator stage passes to said corresponding high pressure auxiliary absorber stage for absorption therein.

3. An absorption refrigeration system as defined in claim 1 including:

(A) a low pressure auxiliary absorber disposed in said weak solution passage means to receive cool weak solution from said absorber, said low pressure auxiliary absorber having a pressure therein intermediate the pressures in said primary evaporator and said high pressure auxiliary absorber during operation of said system;

(B) a low pressure auxiliary evaporator disposed in said strong solution line to receive warm strong solution from said low pressure generator, said low pressure auxiliary evaporator having a pressure therein intermediate the pressures in said low pressure generator and said primary absorber during operation of said system; and (C) refrigerant vapor passage means to pass refrigerant vapor evaporated from strong solution in said low pressure auxiliary evaporator to said low pressure auxiliary absorber for absorption therein, to thereby heat and dilute the weak solution leaving said primary absorber and to further concentrate and cool the strong solution leaving said low pressure generator.

4. An absorption refrigeration system as defined in claim 3 including:

(A) refrigerant liquid passage means for passing liquid refrigerant from said low pressure condenser to said primary evaporator;

(B) a low pressure refrigerant economizer disposed in said passage means for evaporating refrigerant therein; and (C) refrigerant vapor passage means extending between said low pressure economizer and said low pressure auxiliary absorber for passing refrigerant vapor formed in said low pressure economizer to said low pressure auxiliary absorber, to cool refrigerant liquid in said low pressure economizer and to heat weak solution in said low pressure auxiliary absorber.

5. An absorption refrigeration system as defined in claim 1 including:

(A) a high pressure refrigerant liquid passage means for passing refrigerant liquid condensed in said high pressure condenser to said primary evaporator;

(B) a high pressure refrigerant economizer disposed in said high pressure refrigerant liquid passage for evaporating refrigerant therein; and (C) refrigerant vapor passage means extending between said high pressure economizer and said high pressure auxiliary absorber, for passing refrigerant vapor formed in said high pressure economizer to said high pressure auxiliary absorber, to cool refrigerant in said high pressure economizer and to heat and dilute weak solution in said high pressure auxiliary absorber.

6. An absorption refrigeration system as defined in claim 1 including:

(A) a plurality of low pressure auxiliary absorber stages disposed in said weak solution passage means to receive cool weak solution from said absorber, said low pressure auxiliary absorber stages each having a pressure therein intermediate the pressures in said primary evaporator and said high pressure auxiliary absorber during operation of said system, said low pressure auxiliary absorber stages being serially connected for solution flow from said primary absorber toward said high pressure generator, each of said low pressure auxiliary absorber stages having a successively increasing pressure in the direction of solution flow therethrough;

(B) a plurality of low pressure auxiliary evaporator stages disposed in said strong solution passage to receive warm strong solution from said low pressure generator, said low pressure auxiliary evaporator stages each having a pressure therein intermediate the pressures in said low pressure generator and said primary absorber during operation of said system, said low pressure auxiliary evaporator stages being serially connected for solution flow from said low pressure generator toward said primary absorber, each of said low pressure auxiliary evaporator stages having a successively decreasing in the direction of solution flow therethrough when said system is in operation; and (C) a plurality of refrigerant vapor passages for passing refrigerant vapor evaporated from strong solution in said low pressure auxiliary evaporator stages to said low pressure auxiliary absorber stages for absorption therein, each of said stages of said low pressure auxiliary evaporator being connected to a corresponding pressure stage of said auxiliary absorber by one of said refrigerant vapor passages so that refrigerant in said low pressure auxiliary evaporator stage passes to a corresponding low pressure auxiliary absorber stage for absorption therein to thereby heat and dilute the weak solution leaving said primary absorber and to further concentrate and cool the strong solution leaving said low pressure generator.

7. An absorption refrigeration system as defined in claim 1 including high pressure refrigerant liquid passage means for passing refrigerant condensed in said high pressure condenser section of said low pressure generator to said primary evaporator; and refrigerant cooling means disposed in said high pressure refrigerant liquid passage means for cooling the liquid refrigerant condensed in said high pressure condenser section of said low pressure generator prior to passage thereof to said primary evaporator.

8. An absorption refrigeration system as defined in claim 1 including refrigerant liquid passage means for passing condensed refrigerant from said high pressure condenser to said low pressure condenser for evaporating and recondensing a portion of said liquid refrigerant in said low pressure condenser to thereby reject additional heat from said liquid refrigerant in said low pressure condenser prior to passage of said refrigerant to said primary evaporator.

9. A method of producing refrigeration from an absorption refrigeration system having a primary absorber, a primary evaporator, a high pressure generator, a low pressure generator associated with a high pressure condenser, and a low pressure condenser, operatively connected to form a multiple effect absorption refrigeration system, which comprises:
   (A) evaporating refrigerant in the primary evaporator to provide cooling, and absorbing the evaporated refrigerant in an absorbent solution in said primary absorber, thereby forming weak absorbent solution;
   (B) heating said weak absorbent solution in the high pressure generator to form intermediate strength absorbent solution and high pressure refrigerant vapor;
   (C) heating intermediate strength solution in said low temperature generator by condensing high pressure refrigerant vapor in said high pressure condenser in heat exchange relation with intermediate strength solution in said low pressure generator to form strong absorbent solution and low pressure refrigerant vapor;
   (D) condensing said low pressure refrigerant vapor in said low pressure condenser; and
   (E) passing said strong solution to said primary absorber for re-absorption of refrigerant vapor and passing condensed refrigerant vapor to said primary evaporator for re-evaporation thereof;
wherein the improvement comprises:
   (F) cooling and concentrating said intermediate strength solution prior to passage thereof to said low pressure generator by passing said intermediate strength solution through an evaporation zone of intermediate pressure between that in said high pressure generator and that in said low pressure generator, and evaporating additional refrigerant therefrom in said evaporation zone; and
   (G) heating and diluting said weak absorbent solution prior to passage thereof to said high pressure generator by passing said weak solution through an absorption zone of intermediate pressure between that in said primary absorber and that in said high pressure generator, and passing the additional refrigerant vapor formed in said evaporation zone to said absorption zone for absorption into said weak solution therein.

10. A method of producing refrigeration as defined in claim 9 wherein:
   (A) the step of concentrating and cooling intermediate strength absorbent solution is performed by successively passing the intermediate solution through a plurality of successively lower pressure evaporaton zones to successvely further concentrate and to further cool said intermediate absorbant solution; and
   (B) the step of diluting and heating the weak solution is performed by successively passing the weak solusion through a plurality of successively higher pressure absorbtion zones, each of which is in vapor communication with a corresponding pressure evaporation zone through which intermediate solution is flowing so as to absorb refrigerant evaporated therein.

11. A method of producing refrigeration as defined in claim 9 including the additional steps of:
   (A) cooling and concentrating said strong absorbent solution prior to passage thereof to said primary absorber by passing said strong solution through a low pressure evaporation zone of intermediate pressure between that in said primary absorber and that in said low pressure generator, and evaporating additional refrigerant therefrom in said low pressure evaporation zone; and
   (B) heating and diluting said weak absorbent solution prior to passage thereof to said high pressure generator by passing said weak solution through a low pressure absorption zone of intermediate pressure between that in said primary absorber and that in said high pressure generator, and passing the additional refrigerant vapor formed in said low pressure evaporation zone to said low pressure absorption zone for absorption into said weak solution therein.

12. A method of producing refrigeration as defined in claim 11 including the steps of:
   (A) passing condensed low pressure refrigerant from said low pressure condenser to said primary evaporator;
   (B) evaporating a portion of the liquid low pressure refrigerant prior to passing it to said primary evaporator to cool said liquid refrigerant; and
   (C) absorbing the evaporated high pressure refrigerant into weak absorbent solution in said low pressure absorption zone of intermediate pressure, thereby further heating and diluting the weak absorbent solution in said low pressure zone of intermediate pressure.

13. A method of producing refrigeration as defined in claim 9 including the steps of:
   (A) passing condensed high pressure refrigerant from said high pressure condenser section of said low pressure generator to said primary evaporator;
   (B) evaporating a portion of the liquid high pressure refrigerant prior to passing it to said primary evaporator to cool said liquid refrigerant; and
   (C) absorbing the evaporated high pressure refrigerant into weak absorbent solution in said absorption zone of intermediate pressure, thereby further heating and diluting the weak absorbent solution in said zone of intermediate pressure.

14. A method of producing refrigeration as defined in claim 9 including the additional steps of:
   (A) cooling and concentrating said strong absorbent solution prior to passage thereof to said primary absorber by successively passing said strong solution through a plurality of successively lower pressure evaporation zones each having a pressure intermediate between that in said primary absorber and that in said low pressure generator, and successively evaporating additional refrigerant therefrom in said low pressure evaporation zones to successively further concentrate and further cool said strong solution; and
   (B) heating and diluting said weak absorbent solution prior to passage thereof to said high pressure generator by successively passing said weak solution through a plurality of low pressure absorption zones of intermediate pressure between that in said primary absorber and that in said high pressure generator, and passing the additional refrigerant vapor formed in said low pressure evaporation zones to said low pressure absorption zones for absorption into said weak solution therein to successively further heat and further dilute weak solution passing therethrough.

15. A method of producing refrigeration as defined in claim 9 including the steps of: cooling liquid refrigerant formed in said high pressure condenser section of said low pressure generator to provide cooled liquid refrigerant;

and passing said cooled liquid refrigerant to said primary evaporator for evaporation therein.

16. A method of producing refrigeration as defined in claim 9 including the additional steps of: passing liquid refrigerant condensed in the high pressure condenser section of said low pressure generator to said low pressure condenser; and evaporating and recondensing a portion of said liquid refrigerant passed to said low pressure condenser in said low pressure condenser, to cool said refrigerant prior to passage thereof to said primary evaporator.

References Cited
UNITED STATES PATENTS

| | | | |
|---|---|---|---|
| 2,283,213 | 5/1942 | Katzow | 62—484 X |
| 3,273,350 | 9/1966 | Taylor | 62—101 |

LLOYD L. KING, *Primary Examiner.*